(12) United States Patent
Kim et al.

(10) Patent No.: US 7,679,327 B2
(45) Date of Patent: Mar. 16, 2010

(54) METHOD OF ESTIMATING STATE OF CHARGE OF BATTERY

(75) Inventors: Do Youn Kim, Daejeon (KR); Do Yang Jung, Hwaseong-si (KR)

(73) Assignee: LG Chem, Ltd. (KR)

( * ) Notice: Subject to any disclaimer, the term of this patent is extended or adjusted under 35 U.S.C. 154(b) by 655 days.

(21) Appl. No.: 11/432,002

(22) Filed: May 11, 2006

(65) Prior Publication Data

US 2006/0261782 A1    Nov. 23, 2006

(30) Foreign Application Priority Data

May 11, 2005    (KR)    ............... 10-2005-0039335

(51) Int. Cl.
*H02J 7/00*    (2006.01)

(52) U.S. Cl. ............... 320/132; 320/149; 320/151; 324/427; 324/428

(58) Field of Classification Search ............. 320/132, 320/149, 15, 152, 136; 324/427, 432, 428, 324/435
See application file for complete search history.

(56) References Cited

U.S. PATENT DOCUMENTS

| | | | |
|---|---|---|---|
| 6,845,332 B2 * | 1/2005 | Teruo | 702/63 |
| 7,136,762 B2 * | 11/2006 | Ono | 702/63 |
| 7,154,247 B2 * | 12/2006 | Kikuchi et al. | 320/132 |
| 7,382,110 B2 * | 6/2008 | Hogari et al. | 320/132 |
| 7,400,149 B2 * | 7/2008 | Koster et al. | 324/429 |
| 7,446,504 B2 * | 11/2008 | Plett | 320/132 |
| 2003/0097225 A1 | 5/2003 | Teruo | |
| 2006/0055373 A1 * | 3/2006 | Bopp et al. | 320/132 |

* cited by examiner

*Primary Examiner*—Edward Tso
*Assistant Examiner*—Arun Williams
(74) *Attorney, Agent, or Firm*—Cantor Colburn LLP

(57) ABSTRACT

Disclosed are an apparatus and a method for accurately estimating a state of charge of a battery, which can measure a change of temperature and an open circuit voltage so as to estimate the state of charge at an initial time when a vehicle is not driven, and while measuring a decrement in a capacity of a battery according to charging and discharging of the battery when the vehicle is driven. The method includes the steps of: measuring a temperature in an initial estimation of the state of charge; measuring an open circuit voltage; obtaining parameters indicating a change of the open circuit voltage according to a change of temperature; and calculating the state of charge using the parameters and the open circuit voltage which is measured depending on the obtained parameters. The method further includes the steps of: measuring electric current in order to integrate the electric current during an estimation of the state of charge after initial time; calculating a decrement in capacity of the battery according to cycles; and estimating the state of charge by dividing a value, which is obtained by integrating electric current, by the decrement in the capacity of the battery according to the cycles.

8 Claims, 7 Drawing Sheets

SOC vs. OCV

METHOD OF ESTIMATING STATE OF CHARGE OF BATTERY

This application claims the benefit of the filing date of Korean Patent Application No. 2005-39335, filed on May 11, 2005, in the Korean Intellectual Property Office, the disclosure of which is incorporated herein in its entirety by reference.

BACKGROUND OF THE INVENTION

1. Field of the Invention

The present invention relates to a method of estimating a state of charge of battery, and more particularly to a method of estimating a state of charge of a battery for a hybrid-electric vehicle, which can further accurately estimate the state of charge of the battery in consideration of changes of parameters having an effect on the state of charge, when the vehicle is driven and when a vehicle is not driven, respectively.

2. Description of the Prior Art

Generally, electric vehicles use lithium ion batteries, which are secondary batteries, as an energy source for driving, and drive a power generation apparatus using electricity output from the batteries. Driving power is transmitted to driving wheels through a power transmission so as to rotate the driving wheels, thereby enabling the vehicles to drive.

In the batteries, when a terminal voltage between a positive electrode and a negative electrode is gradually reduced to a certain limitation during the procedure of a discharge, the terminal voltage is rapidly lowered to a discharge stopping voltage, so that the battery loses a discharging capability. When the battery continuously discharges electricity having a voltage which is lower than the discharge stopping voltage, the electrode plate, which generates electricity, chemically reacts on the electrolyte and is damaged, so that the battery loses its functions as a condenser.

Thus, the electric vehicle can be driven in proportion with the charging capability of the battery. The electric vehicle generates electricity using the rotation force of the driving wheels while driving, and then recharges the battery. Meanwhile, if the battery is completely discharged during the driving of the electric vehicle, it is difficult to recharge the battery. Thus, it is important to check an accurate state of charge of the battery while the electric vehicle is driving. However, it is difficult to measure the accurate state of charge of the battery, like a fuel gauge of the conventional vehicle, because of irregular characteristic of the battery (which may be changed according to temperature and discharging, etc.).

The methods for checking the state of charge of a battery includes a method for identifying the state of charge of a battery using the voltage of the battery and a method for identifying the state of charge of a battery using a discharging capability, which are commercially used.

In the case of the first method, the voltage decreases according to the discharging of the battery. Specifically, the voltage is instantaneously lowered regardless of the state of charge while the vehicle is rapidly accelerated. Accordingly, there is a limitation in checking the state of charge of the battery in the vehicle. In the case of the second method, since the available state of charge of the battery is changed depending on loading conditions, for example, what constant velocity in Km/h a vehicle drives, or whether or not the vehicle is driven in the city, an algorithm to identify the state of charge of the battery, becomes very complicated.

On the other hand, the state of charge of the battery is generally estimated with reference to an open circuit voltage (OCV) before the vehicle is driven. Such an estimation of the state of charge of the battery presupposes that the open circuit voltage does not change according to an environment. However, since the open circuit voltage is substantially changed according to temperature, the state of charge of the battery cannot be accurately estimated.

Further, in the hybrid-electric vehicle, high electric current is repeatedly charged and discharged. Therefore, the charged and discharged electric current is integrated for a desired time and then the integrated value is divided by a total capacity of the battery, so that the changed state of charge of the battery can be obtained. At this time, as the output and the total capacity of the battery decrease according to the charging and discharging cycles, the state of charge of the battery is changed. However, a method of estimating the state of charge of the battery in consideration of the change of the total capacity and the output of the battery has been not developed yet.

SUMMARY OF THE INVENTION

Accordingly, the present invention has been made to solve the above-mentioned problems occurring in the prior art, and it is an object of the present invention to provide an apparatus and a method for estimating an accurate state of charge, which can measure a change of temperature and an open circuit voltage so as to estimate the state of charge at an initial time when a vehicle is not driven, and while measuring a decrement of a capacity in the battery depending on charging and discharging of the battery when the vehicle is driven.

In order to accomplish the object of the present invention, according to an aspect of the present invention, there is provided a method of estimating a state of charge of a battery, which includes the steps of: measuring temperature in an initial estimation of the state of charge; measuring an open circuit voltage; obtaining parameters indicating a change of the open circuit voltage according to a change of temperature; and calculating the state of charge using the parameters and the open circuit voltage which is measured depending on the obtained parameters.

According to the present invention, the method further includes the steps of: measuring electric current in order to integrate the electric current during an estimation of the state of charge after an initial time; calculating a decrement in capacity of the battery according to cycles; and estimating the state of charge by dividing a value, which is obtained by integrating electric current, by the decrement in the capacity of the battery according to the cycles.

In order to accomplish the object of the present invention, according to another aspect of the present invention, there is provided an apparatus for estimating a state of charge of a battery, which includes: a temperature sensor for measuring temperature; a memory for storing parameters indicating a change of an open circuit voltage according to a change of temperature; a voltage meter for measuring the open circuit voltage; and a controller which measures the temperature and the open circuit voltage through the temperature sensor and the open circuit voltage meter during an initial estimation of the state of charge of the battery and obtains the parameters, which indicate the change of the open circuit voltage according to the change of temperature, from the memory, so as to calculate the state of charge of the battery using the parameters and the open circuit voltage measured according to the obtained parameters.

The apparatus further includes a current meter for measuring electric current, wherein the controller measures electric current through the current meter in order to integrate the electric current during an estimation of the state of charge after an initial time, calculates a decrement of capacity of the battery according to cycles, and estimates the state of charge by dividing a value, which is obtained by integrating electric current, by the decrement in the capacity of the battery according to the cycles.

DETAILED DESCRIPTION OF THE PREFERRED EMBODIMENTS

Hereinafter, the preferred embodiment of the present invention will be described with reference to the accompanying drawings.

It is substantially impossible to detect the accurate state of charge of a battery, but it will be possible that the state of charge of the battery can be indirectly estimated by merely measuring voltage, current, and impedance, etc.

Typically, the state of charge of the battery is estimated through an open circuit voltage. However, even though the open circuit voltage is changed depending on a temperature, the conventional art has estimated the state of charge without consideration of the change of the open circuit voltage depending on temperature, assuming that the open circuit voltage has a fixed value.

Further, in the case of a hybrid-electric vehicle in which electricity is repeatedly charged and discharged, since a total capacity of the battery is reduced according to charging and discharging cycles, the state of charge must be estimated in consideration of the reduction of the total capacity. However, since the conventional art has estimated the state of charge without the consideration of these parameters, there is a limitation that the state of charge has not been accurately estimated.

In order to more accurately estimate the state of charge of the battery, the present invention estimates an initial state of charge depending on temperature and a change of an open circuit voltage according to a change of temperature, which have an effect on a charge state of the battery. Then, the present invention estimates a state of charge allowing for a reduction of a total capacity of the battery according to a charging and discharging cycles, while a vehicle drives, thereby accurately estimating the state of charge.

Figure 1:
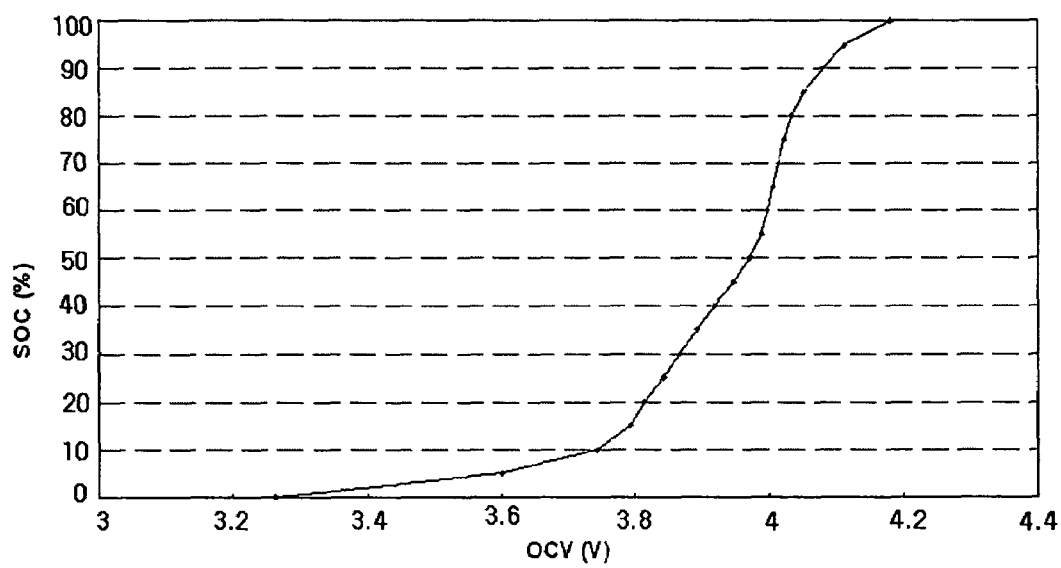
FIG. 1 is a graph illustrating a correlation of a state of charge and an open circuit voltage.

First, the correlation of the open circuit voltage and the state of charge is measured in order to calculate an initial state of charge, and a graph is obtained as shown in FIG. 1.

Figure 2:
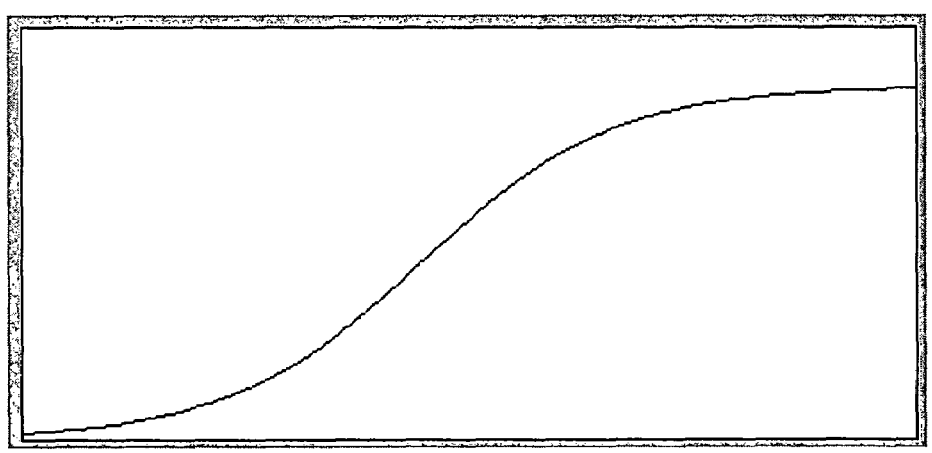
FIG. 2 is a graph showing a Sigmoidal curve.

In FIG. 1, a curve representing the correlation of the open circuit voltage and the state of charge is similar to a sigmoidal curve having two asymptotes at upper and lower portions in FIG. 2.

Therefore, the curve of FIG. 1 can be expressed by a following equation (1):

$$y = a[1 + (b-1)^{(-c(x-d))}]^{\frac{1}{1-b}} \quad (1)$$

wherein y represents a state of charge, x indicates an open circuit voltage, a is an upper asymptote, b is a parameter for indirectly determining an inflection point, c is a scaling factor, and d is a position of an inflection point relating to an axis of x.

Accordingly, an equation for calculating the state of charge according to the open circuit voltage can be obtained through the process.

Figure 3:
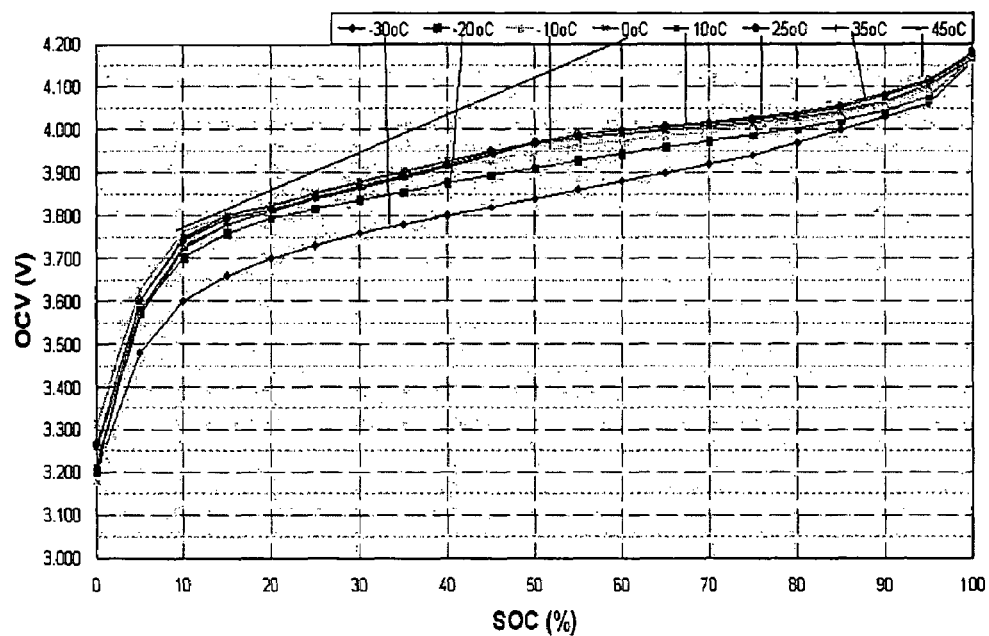
FIG. 3 is a graph illustrating a change of the correlation of the state of charge and the open circuit voltage according to a change of temperature.

However, as the open circuit voltage is changed depending on temperature, a graph shown in FIG. 3 can be obtained when the change of the open circuit voltage and the state of charge according to the change of temperature is measured.

Referring to FIG. 3, in the graph illustrating the correlation of the open circuit voltage and the state of charge, the upper asymptote a, the inflection points b and d, and the scaling factor c can be changed according to the temperature.

Figure 4:
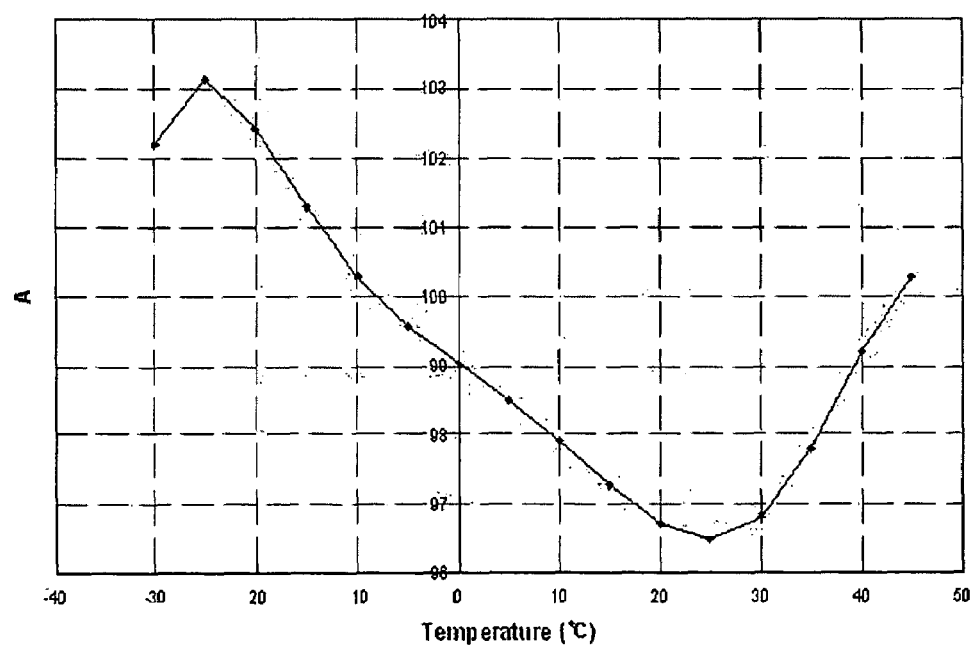
FIGS. 4 to 7 are graphs illustrating characters of parameters according to a change of temperature.
Figure 7:
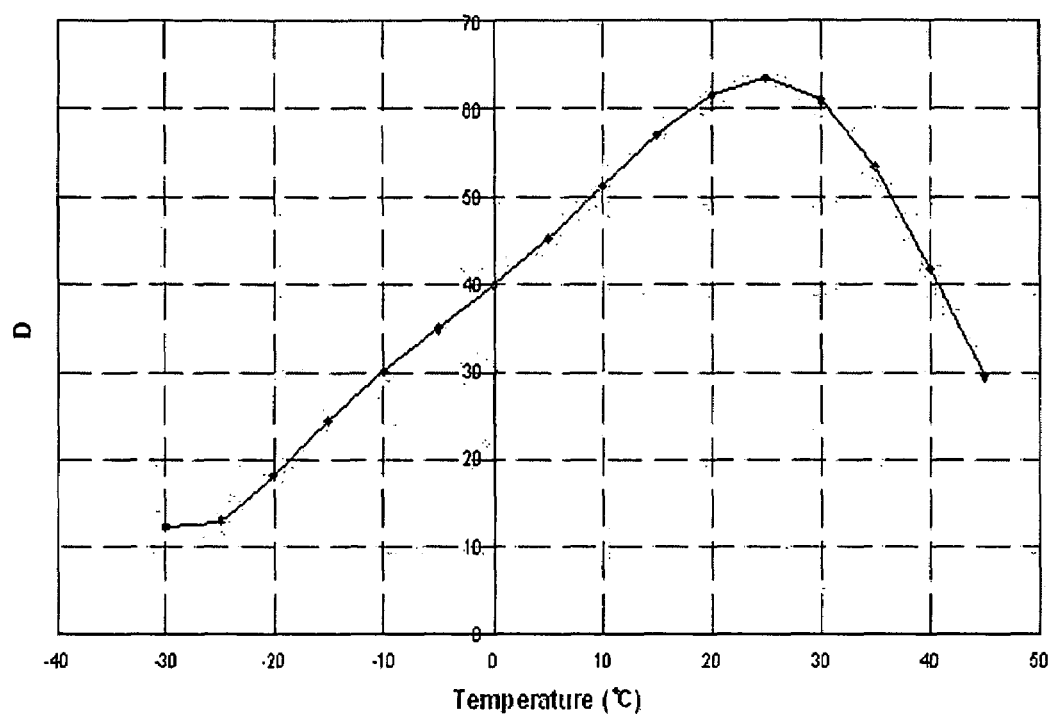

Thus, the upper asymptote a, the inflection points b and d, and the scaling factor c are measured which are changed depending on the change of the temperature, so as to obtain graphs shown in FIGS. 4 and 7.

Figure 5:
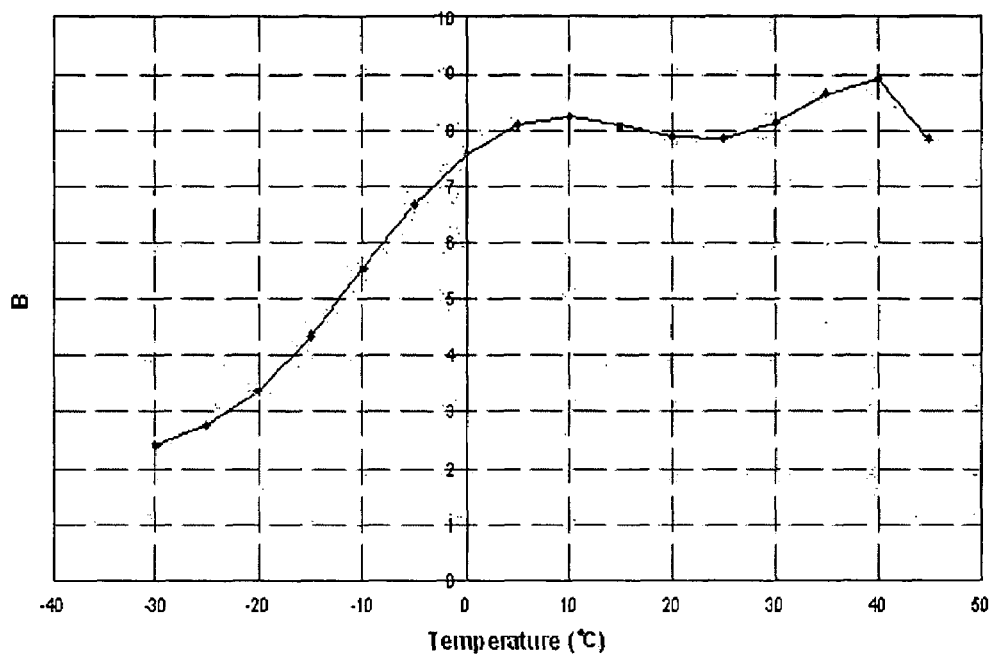
Figure 6:
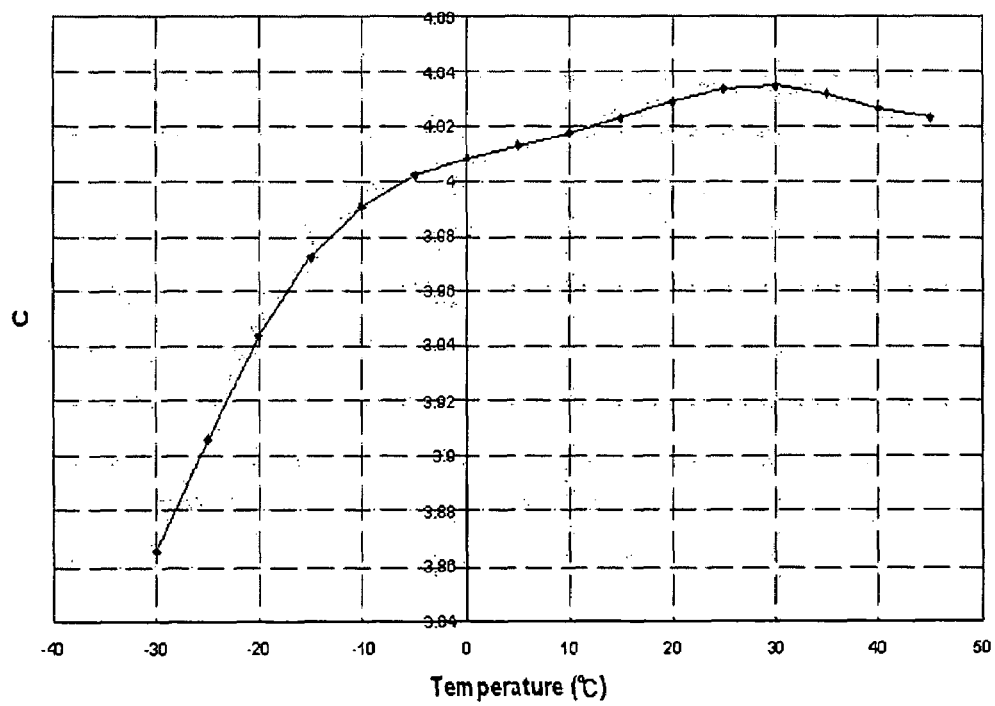

FIG. 4 shows the change of the upper asymptote a according to the change of temperature. FIG. 5 shows the change of the inflection point b according to the change of temperature. FIG. 6 shows the change of the scaling factor c according to the change of temperature, and FIG. 7 shows the change of the inflection point d according to the change of temperature.

The upper asymptote a, the inflection points b and d, and the scaling factor c according to the change of temperature as shown in FIGS. 4 to 7 are stored in a memory so as to correspond to the temperatures respectively, and be used for calculating the state of the charge.

On the other hand, the upper asymptote a, the inflection points b and d, and the scaling factor c according to the change of temperature can be realized by an equation using the graphs as shown in FIGS. 4 to 7

Further, in driving, charged and discharged current is integrated so that the state of charge is estimated. The estimation of the state of charge is expressed by a following equation (2):

$$SOC_k = SOC_{k-1} + \frac{E_{cha} \times I_{cha} \times t - E_{dch} \times I_{dch} \times t}{C_{init} \times F_{(c)}(\text{cycle})} \times 100 \quad (2)$$

wherein $SOC_{k-1}$ is a previous SOC. After the initial SOC is calculated by the equation 1, the initial SOC is used as $SOC_{k-1}$. Then, the previous SOC is used as $SOC_{k-1}$. Further, in the equation (2), $E_{cha}$ is a charging efficiency, and $E_{dch}$ is a discharging efficiency. $I_{cha}$ is a charged current, $I_{dch}$ is a discharged current, and t is time. $C_{init}$ is an initial capacity of the battery, and $F_c(\text{cycle})$ indicates the decrement in the capacity of the battery according to cycles.

In the equation (2), the SOC is divided by the decrement of the capacity of the battery according to the cycles in a general manner of integrating the charging and discharging current.

The SOC should be reduced according to the decrement in the capacity of the battery according to the cycles.

The present invention compensates for the decrement of the capacity of the battery according to repeated charging and discharging cycles, so as to further increase the accuracy for the estimation of the state of charge.

Figure 8:
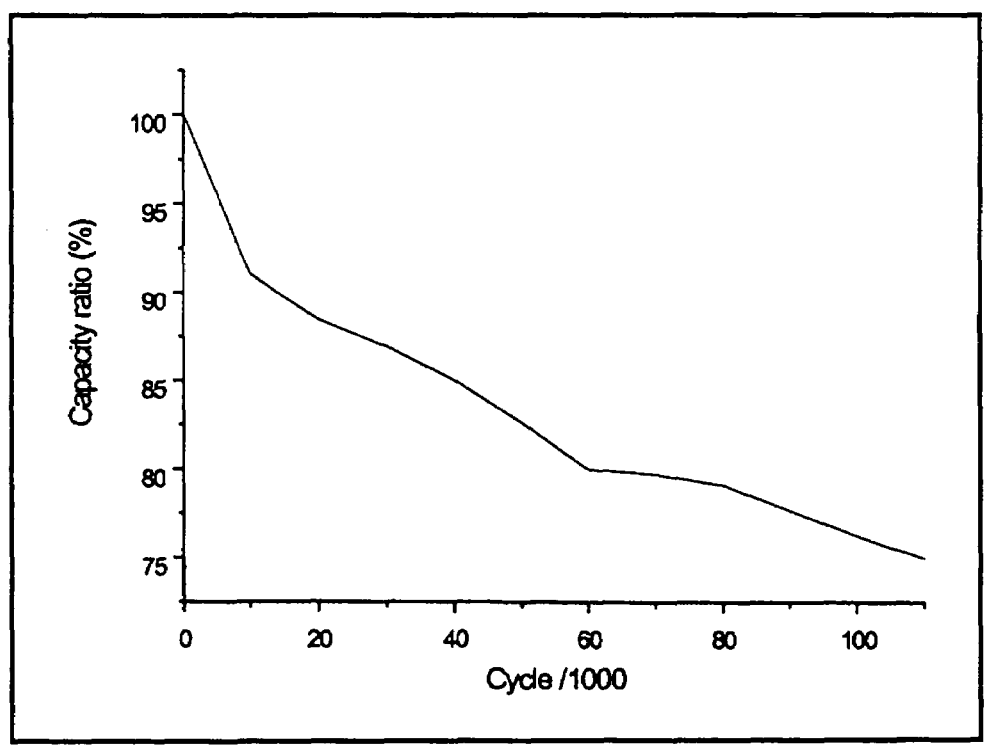
FIG. 8 is a graph illustrating a decrement in the capacity of the battery according to cycles.

The decrement in the capacity of the battery Fc(cycle) according to the cycles can be represented with a graph, based on experimental data with respect to an accumulated discharging capacity and the decrement of the capacity of the battery, as shown in FIG. 8. The decrement in the capacity of the battery according to the cycles can be expressed by a following equation (3) using the graph shown in FIG. 8.

$$F_c(\text{cycle}) = D_5 \times d^5 + D_4 \times d^4 + D_3 \times d^3 + D_2 \times d^2 + D_1 \times d + D_0 \quad (3)$$

wherein d is an accumulated charging capacity and is within a range of [0, 33330]. In the case of inputting the accumulated charging capacity as an input value into a function, d is changed into a value with a range of [−1, 1] and input into the function.

The equation (3) can be detailed and expressed by a following equation (4):

$$F_c(\text{cycle}) = -0.82345d^5 + 0.4097d^4 + 0.82345d^3 - 0.082476d^2 - 0.80103d + 6.2177$$

Figure 9:
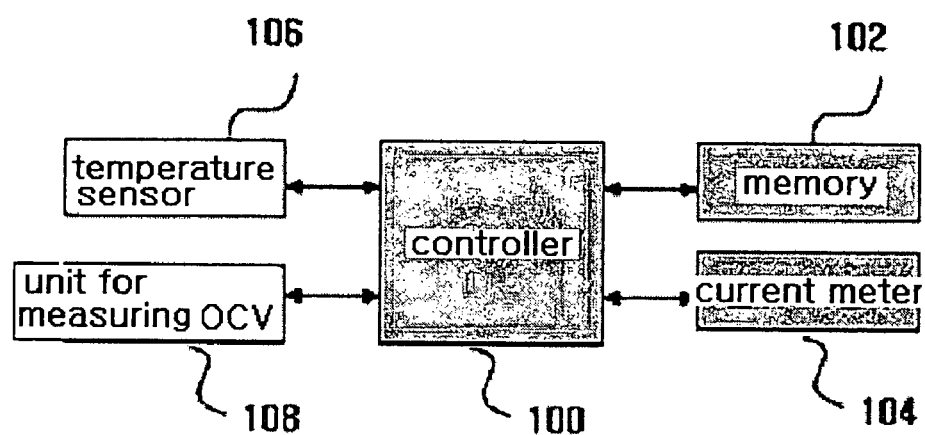
FIG. 9 is a block diagram illustrating an apparatus for estimating the state of charge according to the preferred embodiment of the present invention.

Hereinafter, the structure of a battery management apparatus for calculating the state of charge using the equations will be described with reference to FIG. 9.

A controller 100 generally controls a battery, and also calculates an initial state of charge and the state of charge in a vehicle driving, according to the preferred embodiment of the present invention.

A memory 102 stores a variety of information including a processing program of the controller 100. Specifically, the memory 102 stores the state of charge calculated according to the preferred embodiment of the present invention, parameters a, b, c and d depending on temperature, the accumulated discharging capacity d, the charging efficiency $E_{cha}$, the discharging efficiency $E_{dch}$, the charged current $I_{cha}$, the discharged current $I_{dch}$, the time t, and the initial capacity $C_{init}$ of the battery.

An current meter 104 measures current in order to calculate the state of charge in the vehicle driving, and provides the value to the controller 100.

A temperature sensor 106 detects temperature in order to calculate an initial state of charge, and provides a result to the controller 100.

A unit 108 for measuring the open circuit voltage measures the open circuit voltage in order to calculate the initial state of charge, and provides the result to the controller 100.

Figure 10:
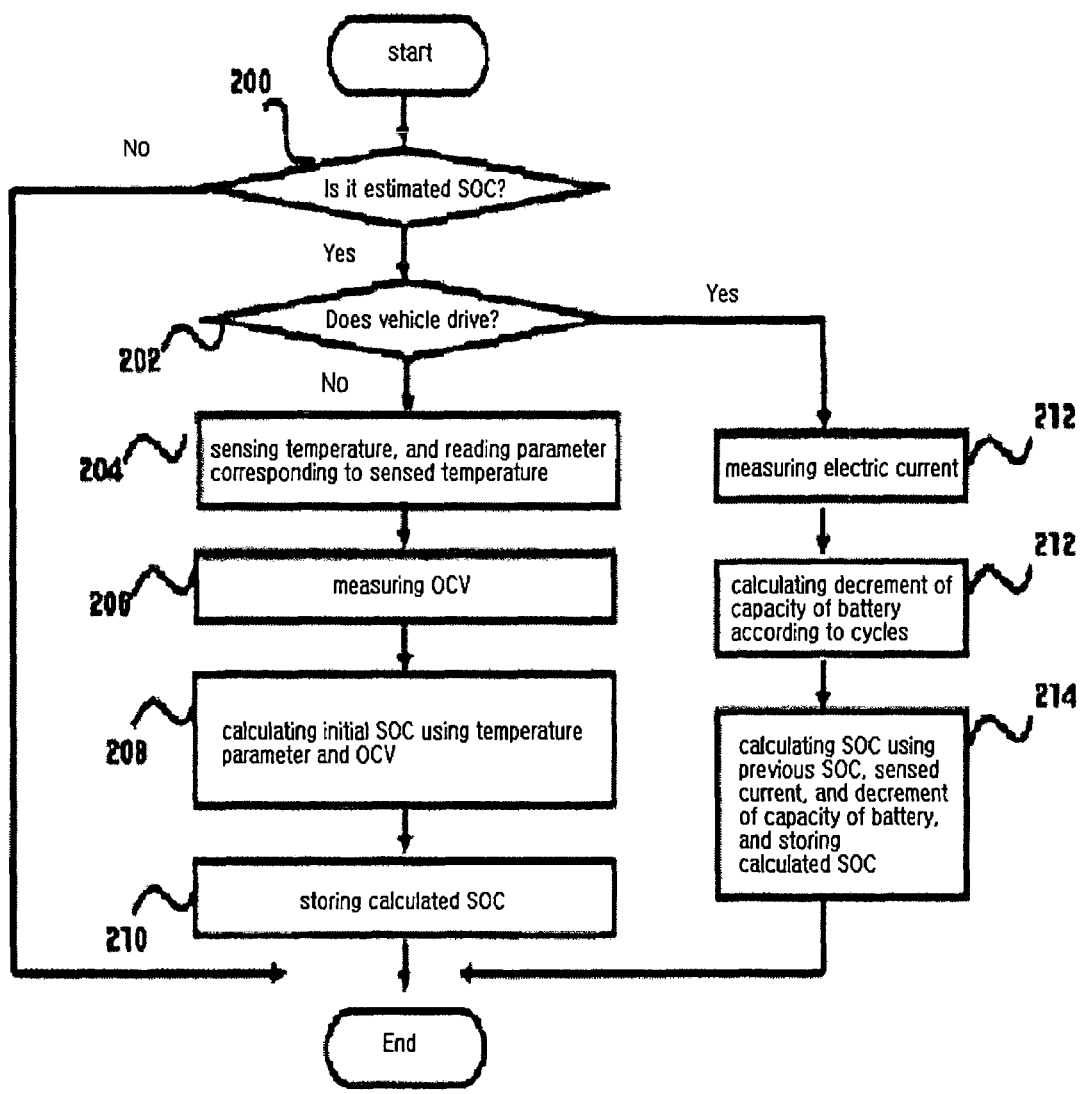
FIG. 10 is a flowchart illustrating a method of estimating the state of charge according to the preferred embodiment of the present invention.

Hereinafter, the method for estimating the state of charge will be described with reference to FIG. 10, according to the preferred embodiment of the present invention applicable for the battery management apparatus.

The controller 100 checks if the vehicle drives (step 202) when an estimation of the state of charge is required to manage an external device or a battery (step 200). Here, the controller 100 receives information relating to the driving state of the vehicle from a control apparatus of the vehicle, or checks the driving state based on the use of the battery.

If the vehicle is not driven, the controller 100 determines that the vehicle is in an initial state, and starts a process for estimating the initial state of charge.

The controller 100 measures the temperature through the temperature sensor 106 in order to estimate the initial state of charge, and then reads the parameters corresponding to the measured temperature from the memory 102 (step 204). The parameters includes the upper asymptote a, the inflection points b and d, and the scaling factor c which are used for estimating the state of charge by using the equation (1).

When the controller 100 completes reading the parameters corresponding to the measured temperature, the controller 100 measures the open circuit voltage using the unit 108 for measuring the open circuit voltage (step 206).

When the measurement of the open circuit voltage is completed, the controller 100 calculates the initial state of charge using the parameters corresponding to the temperature, and the measured open circuit voltage according to the equation (1) (step 208).

When the initial state of charge has been calculated, the controller 100 stores the calculated initial state of charge in the memory 102 (step 210).

If it is determined that the vehicle is not driving, at step 202, the controller 100 measures the electric current by using the current meter 104 (step 212).

When the electric current has been measured, the controller 100 reads the accumulated discharging capacity d from the memory 102 and calculates the decrement in the capacity of the battery according to cycles by using the equation (3) (step 214).

The controller finishes calculating the decrement in the capacity of the battery according to the cycles, and then calculates the state of charge of the driving vehicle by using the initial or previous state of charge, the measured electric current, and the decrement in the capacity of the battery according to the cycles, based on the equation (2). Finally, the controller 100 stores the calculated state of charge in the memory (102) (step 216).

Figure 11:
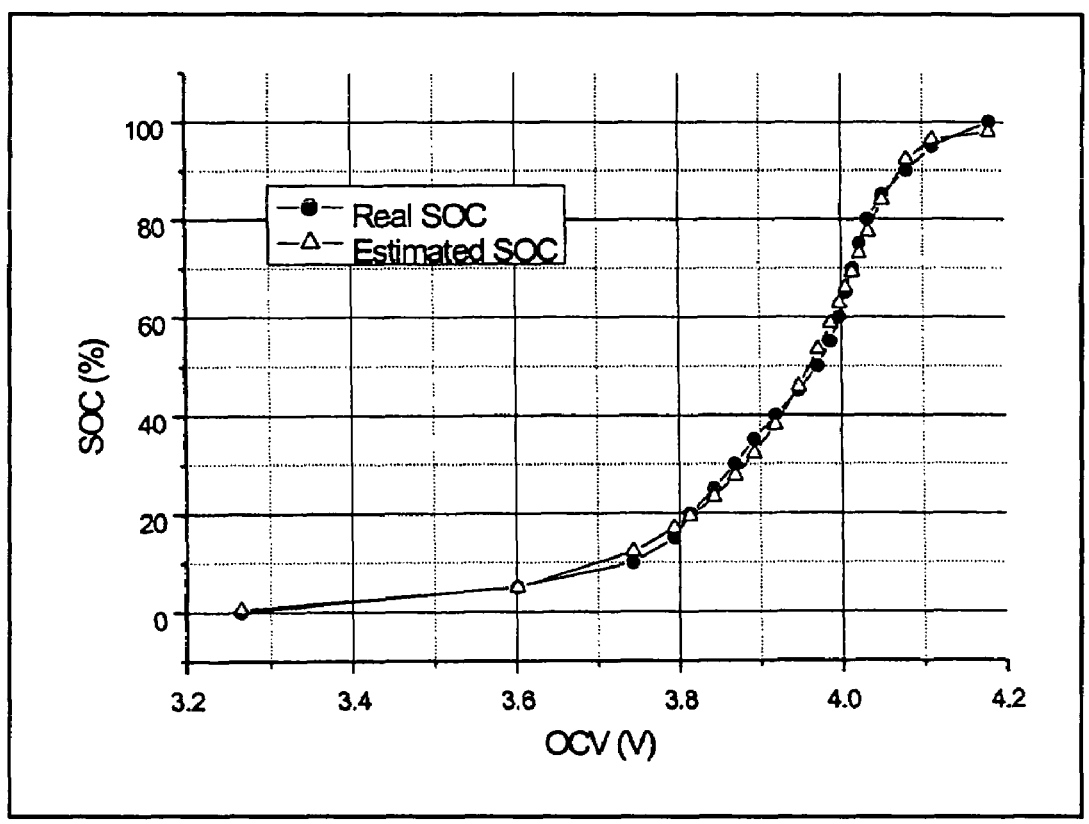
FIG. 11 is a graph illustrating the estimation of the state of charge according to the preferred embodiment of the present invention.

In order to verify the accuracy of the method for estimating the state of charge of the battery according to the present invention, a test is performed so as to obtain the result as shown in FIG. 11.

FIG. 11 is a graph illustrating an example of the state of charge with relation to the open circuit voltage obtained by using the method for estimating the state of charge at a temperature of 25° C., in which a maximum error of the state of charge is about 3.6%. In the estimation of the real state of charge of the battery, the maximum error is within an allowable range. Thus, it is noted that the state of charge of the battery which is substantially identical with the real state of charge can be accurately estimated.

INDUSTRIAL APPLICABILITY

Since the present invention estimates the state of charge using the open circuit voltage at an initial state when the vehicle is not driven, and compensates for the change of temperature, it is possible to estimate the state of charge at a certain temperature. In the case where the vehicle is driving, the present invention compensates for the decrement of the capacity of the battery in which the capacity of the battery is reduced according to the charging and discharging cycles, as well as the temperature compensation, thereby further accurately estimating the state of charge.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of estimating a state of charge of a battery, comprising the steps of:
    measuring temperature in an initial estimation of the state of charge;
    measuring an open circuit voltage;
    obtaining parameters indicating a change of the open circuit voltage according to a change of temperature;
    storing the obtained parameters in a memory; and
    calculating, in a controller, the state of charge using the parameters and the open circuit voltage which is measured depending on the obtained parameters,
    wherein the state of charge is calculated by the following equation (5):

$$y = a[1 + (b-1)^{(-c(x-d))}]^{\frac{1}{1-b}} \quad (5)$$

in which y is the state of charge, x is the open circuit voltage, and a, b, c, and d are the parameters corresponding to the respective temperatures, in which a indicates an upper asymptote, b is a parameter which indirectly settles a deflection point, c is a scaling factor, and d indicates a position of a deflection point with respect to an X axis.

2. The method as claimed in claim 1, wherein the parameters, which indicates the change of the open circuit voltage according to the change of temperature, are obtained from a table in which parameters corresponding to respective temperatures are mapped.

3. The method as claimed in claim 1, further comprising the steps of:
    measuring electric current in order to integrate the electric current during an estimation of the state of charge after initial time;
    calculating a decrement in capacity of the battery according to charging and discharging cycles; and
    estimating the state of charge by dividing a value, which is obtained by integrating electric current, by the decrement in the capacity of the battery according to the cycles.

4. The method as claimed in claim 3, wherein the decrement in the capacity of the battery according to the cycles is calculated by a following equation (8):

$$F_c(\text{cycle}) = D_5 \times d^5 + D_4 \times d^4 + D_3 \times d^3 + D_2 \times d^2 + D_1 \times d + D_0 \quad (8)$$

wherein $D_O$, $D_1$, $D_2$, $D_3$, $D_4$, and $D_5$ are constants, and d is an integrated discharge capacity.

5. A method of estimating a state of charge of a battery, comprising the steps of:
    measuring electric current in order to integrate the electric current during an estimation of the state of charge;
    calculating a decrement in capacity of the battery according to charging and discharging cycles; and
    estimating the state of charge by dividing a value, which is obtained by integrating electric current, by the decrement in the capacity of the battery according to the cycles,
    wherein the decrement in the capacity of the battery according to the cycles is calculated by a following equation (6):

$$F_c(\text{cycle}) = D_5 \times d^5 + D_4 \times d^4 + D_3 \times d^3 + D_2 \times d^2 + D_1 \times d + D_0 \quad (6)$$

wherein $D_O$, $D_1$, $D_2$, $D_3$, $D_4$, and $D_5$ are constants, and d is an integrated discharge capacity.

6. A method of estimating a state of charge of a battery, comprising the steps of:
    measuring electric current in order to integrate the electric current during an estimation of the state of charge;
    calculating a decrement in capacity of the battery according to charging and discharging cycles; and
    estimating the state of charge by dividing a value, which is obtained by integrating electric current, by the decrement in the capacity of the battery according to the cycles,
    wherein the state of charge (SOC) is calculated by a following equation (7):

$$SOC_k = SOC_{k-1} + \frac{E_{cha} \times I_{cha} \times t - E_{dch} \times I_{dch} \times t}{C_{init} \times F_c(\text{cycle})} \times 100 \quad (7)$$

wherein $SOC_{k-1}$ is a previous SOC, $E_{cha}$ is a charging efficiency, $L_{dch}$ is a discharging efficiency, $I_{cha}$ is a charging current, $I_{dch}$ is a discharging current, t is time, $C_{init}$ is an initial capacity of the battery, and $F_c$(cycle) is a decrement in a capacity of the battery according to cycles.

7. An apparatus for estimating a state of charge of a battery, comprising:
    a temperature sensor for measuring temperature;
    a memory for storing parameters indicating a change of an open circuit voltage according to a change of temperature;
    a voltage meter for measuring the open circuit voltage; and
    a controller which measures the temperature and the open circuit voltage through the temperature sensor and the open circuit voltage meter during an initial estimation of the state of charge of the battery and obtains the parameters, which indicate the change of the open circuit voltage according to the change of temperature, from the memory, so as to calculate the state of charge of the battery using the parameters and the open circuit voltage measured according to the obtained parameters,
    wherein the state of charge is calculated by the following equation (5):

$$y = a[1 + (b-1)^{(-c(x-d))}]^{\frac{1}{1-b}} \quad (5)$$

in which y is the state of charge, x is the open circuit voltage, and a, b, c, and d are the parameters corresponding to the respective temperatures, in which a indicates an upper asymptote, b is a parameter which indirectly settles a deflection point, c is a scaling factor, and d indicates a position of a deflection point with respect to an X axis.

8. The apparatus as claimed in claim 7, farther comprising a current meter for measuring electric current, wherein the controller measures electric current through the current meter in order to integrate the electric current during an estimation of the state of charge after an initial time, calculates a decrement of capacity of the battery according to cycles, and estimates the state of charge by dividing a value, which is obtained by integrating electric current, by the decrement in the capacity of the battery according to the cycles.

* * * * *